UNITED STATES PATENT OFFICE.

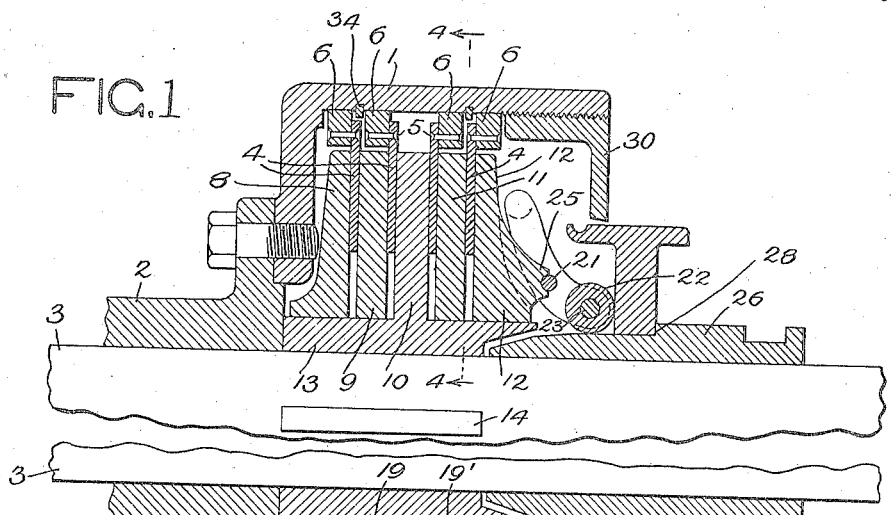

JOHN F. DORNFELD, OF CHICAGO, ILLINOIS.

CLUTCH.

1,233,561.     Specification of Letters Patent.     Patented July 17, 1917.

Application filed January 24, 1916. Serial No. 73,822.

*To all whom it may concern:*

Be it known that I, JOHN F. DORNFELD, a citizen of the United States, residing at Chicago, in the county of Cook and State of Illinois, have invented certain new and useful Improvements in Clutches, of which the following is a specification.

This invention relates to friction clutches and particularly to friction clutches of the type known as disk clutches. In clutches of this type there are friction rings or disks, some of which are connected to the driving member of the clutch and the remainder to the driven member of the clutch, said rings or disks forming the frictional driving connection between the clutch members.

One of the objects of the invention is to provide improved means for bringing the friction elements into driving contact, which shall be simple, cheap in construction and not likely to get out of repair.

Another object of the invention is to provide a means for separating the friction elements when the pressure upon them has been withdrawn.

A general object of the invention is to produce a friction clutch of such simple construction that the parts thereof may be produced largely by means of lathe work and punch-press operations; which shall be of such nature that clutches of various power-transmitting capacities may be made up by using a greater or lesser number of duplicate parts; which shall have a minimum number of different parts, thus reducing the number of different parts which must be carried in stock; and which may be easily and quickly assembled.

In the accompanying drawings, Figure 1 is a fragmental longitudinal sectional view of a friction clutch embodying the features of my invention, the view being taken in the plane of dotted line 1—1 of Fig. 3. Fig. 2 is a fragmental longitudinal section on dotted line 2—2 of Fig. 3. Fig. 3 is a fragmental end view of the fulcrum ring. Fig. 4 is a fragmental transverse section on dotted line 4—4 of Fig. 1. Fig. 5 is a perspective view of one of the elements of the operating mechanism.

A clutch of the character herein disclosed is adapted for use either as a shaft coupling or as a so-called pulley clutch. The embodiment herein shown of the invention comprises a casing 1 attached to or including a sleeve or hub 2. Upon the casing or the hub may be secured a brake band, a gear wheel, a pulley or any other device or combination of devices to be actuated or controlled by the clutch. The sleeve 2 is rotatably mounted upon the shaft 3. If the clutch were to be used as a shaft coupling, the sleeve 2 would be fixed upon one of two alined shaft-sections.

Within the casing 1 are located two series of friction elements, one of which is connected to the casing and the other to the shaft 3 in order that when two series of elements are pressed together with sufficient force, the casing and the shaft shall rotate together. One of the series of friction elements consists of a plurality of annular rings 4 of sheet metal, each fastened by means of rivets 5 to a ring 6. The rings 6 are mounted for limited sliding movement longitudinally of the casing but are caused to rotate with the casing by suitable means, as, for example, one or more feathers 7. I would have it understood that other forms of friction elements may be used in place of the rings 4 and 6.

The friction elements 8, 9, 10, 11 and 12 of the other series alternate with the rings 4 and are mounted upon a hub or sleeve 13 which is secured to the shaft 3 by means of a key 14 or other suitable means. The friction element 10 is an annular flange which is rigid with the sleeve 13. The elements 8, 9, 11 and 12 are rings which are mounted upon the sleeve 13 for sliding movement longitudinally of the sleeve, but which are caused to rotate with the sleeve 13 by suitable means, as for example, one or more feathers 15 or the bolts or studs 16. The feathers 15 may, if desired, be omitted. The bolts or studs 16 are fixed to the ring 8 and pass freely through the elements 9, 10, 11 and 12. Upon the outer ends of said bolts is slidably supported an abutment ring 17, the ring being confined upon the bolts by means of nuts 18. Surrounding the bolts 16 are coiled compressed springs 19, 19' lying within openings in the rings 9 and 11 and tending to move the rings 8 and 12 away from the flange 10.

Interposed between the rings 12 and 17 is a plurality of similar operating levers 20 (only one of which is shown in the drawings). Each of said levers consists of a fulcrum pin 21, a friction roller 22 upon a pin 23, and the side pieces 24. Upon the ring 12 are formed bearing sockets 25 to receive the fulcrum pins 21. The rollers 22 are arranged to be pressed against the ring 17 by means of a collar 26 having an inner tapered end and an annular groove 27 to receive the forked end of a suitable operating element (not shown). 28 is an annular shoulder to limit inward movement of the collar 26. The ends of the operating levers 20 opposite the rollers 22 are provided with counterbalance weights 29 for the purpose to appear hereinafter.

The casing 1 comprises an annular inwardly-extending closing flange 30 which extends close to the ring 17. The ring 17 has a rim 31 projecting into the casing, and this rim has a groove 32 in its outer periphery. The purpose of this rim and groove is to prevent oil from getting out of the clutch casing when the latter contains a quantity of oil.

Coiled springs 33 are interposed between the rings 6 and serve to move the friction elements 4 away from the friction elements 8, 9, 10, 11 and 12 when the clutch is thrown out. 34 are stop rings fitted into grooves formed in the inner periphery of the casing 1 and serving as stops for the two inner rings 6 when the clutch is released and the springs 33 are free to act. Preferably, the stop rings 34 are made of a larger diameter than the largest diameter of the grooves into which they fit; a small portion of the ring is then cut out, as shown at 35 in Fig. 4, and the ring sprung into place. The surfaces 36 and 37 serve as stops to limit the movement of the two outer rings 6 under the action of the springs 33.

The operation of the clutch is as follows: Figs. 1 and 2 show the clutch as thrown in, the casing 1 and the hub 2 being clutched to the shaft 3. To throw out the clutch, the collar 26 is moved to the right, whereupon the rollers 22 move down the tapered end of said collar and toward the axis of the shaft 3. Such movement of the rollers 22 is caused in part by the expansion of the springs 19 and the consequent movement of the ring 17 to the left; in part by the expansion of the springs 19' and the consequent movement of the ring 12 to the right; and in part by the outward movement of the counterbalance weights 29 29 through the action of centrifugal force. The expansion of the springs 19, 19' and 33 causes separation of the friction elements from one another.

When the casing 1 and the sleeve 2 are to be clutched to the shaft 3, the collar 26 is moved inwardly, whereby the rollers 22 are moved outwardly against the ring 17, thereby moving said ring outwardly, that is to say, toward the right in Figs. 1 and 2. When thus moved the ring 17 draws the friction elements 8 and 9 and the two adjacent rings 4 against the flange 10. Such outward movement of the ring 17, of course, ceases when said rings 4, 8 and 9 are drawn into contact with the flange 10. When the rollers 22 are crowded outwardly into contact with the ring 17 by the tapered surface of the collar 26, the rings 11 and 12 and the two adjacent rings 4 are forced into contact with the flange 10.

It will be seen that when the collar 26 is moved outwardly to throw out the clutch, the springs 19, 19' and 33 and the counterbalance weights 29 will effect the throwing out of the clutch with certainty.

The nuts 18 may be turned on the bolts 16 to adjust the clamping action and to take up wear.

I would have it understood that the clutch shown in the drawings is merely illustrative of the invention, and that a larger or smaller number of friction rings may be employed corresponding to the desired power-transmitting capacity of the clutch. Various other changes also may be made by those skilled in the art without departing from the spirit and scope of the invention as set forth in the appended claims.

In certain of the claims I have used the term "an inner member" to designate the sleeve 13 and its equivalents, and the term "an outer member" to designate the casing 1 and the sleeve 2 and their equivalents.

I claim as my invention:

1. A friction clutch having, in combination, a casing, a sleeve within the casing, a plurality of rings connected to the casing for axial sliding movement, springs tending to separate said rings, an annular friction element secured to each of said rings, a friction flange rigid with the sleeve, two annular friction elements connected to the sleeve for axial sliding movement and located one at each side of said flange, springs tending to separate the friction elements from the flange, bolts connected to one of the sliding elements upon the sleeve, an annular abutment supported by said bolts, a lever pivotally supported upon the other of the slidable elements on the sleeve, and a sleeve extending slidably through said abutment and arranged to pivotally move said lever against the abutment.

2. A friction clutch having, in combination, a casing, a sleeve within the casing, a plurality of friction elements connected to the casing, a plurality of friction elements connected to the sleeve, certain of said last mentioned elements being arranged for axial sliding movement, an annular abutment connected to one of the sliding elements upon the sleeve, a lever pivotally supported upon another of the slidable elements on the clutch, and a sleeve extending slidably through said abutment and arranged to pivotally move said lever against the abutment, said abutment having an extending rim, and the casing having an annular closing flange extending into proximity to the rim.

3. A friction clutch having, in combination, a casing, a sleeve within the casing, a plurality of rings connected to the casing for axial sliding movement, springs tending to separate said rings, an annular friction element secured to each of said rings, a plurality of annular friction elements connected to the sleeve, certain of said last mentioned elements being arranged for axial sliding movement, springs tending to move said certain elements away from each other, bolts connected to one of the sliding elements upon the sleeve, an abutment supported by said bolts, a lever pivotally supported upon another of the slidable elements on the sleeve, and a reciprocatory sleeve arranged to pivotally move said lever against the abutment.

4. A friction clutch having, in combination, a casing, a sleeve within the casing, a plurality of rings connected to the casing for axial sliding movement, an annular friction element secured to each of said rings, a plurality of annular friction elements connected to the sleeve, certain of said last mentioned elements being arranged for axial sliding movement, spring means tending to separate the friction elements, bolts connected to one of the sliding elements upon the sleeve, an annular abutment supported by said bolts, a lever pivotally supported upon another of the slidable elements on the sleeve, and a sleeve extending slidably through said abutment and arranged to pivotally move said lever against the abutment.

5. A friction clutch having, in combination, a casing, a sleeve within the casing, a friction ring connected to the casing for axial sliding movement, two friction rings connected to the sleeve for axial sliding movement, spring means tending to separate said friction rings, an abutment connected to one of the rings of the sleeve, a lever pivoted to the other ring of the sleeve and arranged to bear against the abutment, and means for forcing the lever against the abutment.

6. A friction clutch having, in combination, a casing, a sleeve within the casing, a friction ring connected to the casing for axial sliding movement, two friction rings connected to the sleeve for axial sliding movement and lying at opposite sides of the other ring, spring means tending to separate said friction rings, an annular abutment, bolts connecting the abutment to one of the rings of the sleeve and supporting the abutment at one side of all of the rings, a member interposed between the abutment and the other ring of the sleeve, and means for moving said member to increase the distance between the abutment and the last mentioned ring.

7. A friction clutch having, in combination, a casing, a sleeve within the casing, a friction ring connected to the casing for axial sliding movement, two friction rings connected to the sleeve for axial sliding movement and lying at opposite sides of the other ring, spring means tending to separate said friction rings, an abutment having a loose connection with one of the rings of the sleeve, a member interposed between the abutment and the other ring of the sleeve, and means for moving said member to increase the distance between the abutment and the last mentioned ring.

8. A friction clutch having, in combination, coacting friction elements, an abutment connected to one of the friction elements, a lever interposed between the abutment and the friction elements, and means for pivotally moving said lever in the direction to force the abutment away from the adjacent friction element, said lever having a counterbalance portion tending in the rotation of the clutch to pivotally move the lever in the opposite direction.

9. A friction clutch having, in combination, coacting friction elements, and means to force said elements into engagement with each other, said means including a tapered sleeve having a sliding movement into and out of operative position, said means also including a pivoted part adapted to swing in a plane radial to the axis of the clutch having a counterweight actuated by centrifugal force to pivotally move said part into inoperative position upon the movement of the sleeve into inoperative position.

10. A friction clutch having, in combination, coacting friction elements, and means to force said elements into engagement with each other, said means including a pivoted part adapted to swing in a plane radial to the axis of the clutch and a device to move said part in the direction to force the friction elements into engagement with each other, said device being withdrawable from said part, said part having a counterweight actuated by centrifugal force to pivotally move said part into inoperative position upon withdrawal of said device.

11. A friction clutch having, in combination, coacting friction elements, an abutment having a loose connection with one of the friction elements, a lever interposed between the abutment and the friction elements, means for pivotally moving said lever to force the abutment away from the adjacent friction element, and means for pivotally moving said lever in the opposite direction.

12. A friction clutch having, in combination, coacting friction elements, and means to force said elements into engagement with each other, said means including a tapered sleeve having a sliding movement into and out of operative position, and means adapted to swing in a plane radial to the axis of the sleeve and actuated by centrifugal force to restore another part of said forcing-means to inoperative position upon the movement of the sleeve into inoperative position.

13. A friction clutch having, in combination, an inner member, an outer member, friction elements carried by said members, spring means tending to separate said friction elements, an abutment having a loose connection with one of the friction elements, an operating lever interposed between the abutment and another of the friction elements, and means for moving said lever to increase the distance between the abutment and the last mentioned friction element.

14. A friction clutch having, in combination, an inner member, an outer member, a friction element carried by the outer member, two friction elements carried by the inner member, the last mentioned elements being located one at each side of the first mentioned element, spring means tending to separate said friction elements, an abutment having a loose connection with one of the two friction elements carried by the inner member, an operating lever interposed between the abutment and the other of said two friction elements, and means for moving said lever to increase the distance between the abutment and the last mentioned friction element.

15. A friction clutch having, in combination, an inner member and an outer member, a central friction element rigid with said inner member, a friction ring at each side of the central element and slidably carried by said outer member, two end friction elements slidably carried by said inner member, each of said end elements lying adjacent to one of said friction rings, an abutment slidably connected to one of the end friction elements and arranged to draw the end element toward the central friction element, a member interposed between the abutment and the other end friction element, and means for moving said member to increase the distance between the abutment and the last mentioned end friction element.

16. A friction clutch having, in combination, an outer member, an inner member, a fixed central friction element thereon, a friction ring at each side of the central element, friction elements slidable longitudinally on the inner member, an abutment connected to one of the slidable friction elements and arranged to draw one of the slidable elements toward the central element, a member interposed between the abutment and another slidable friction element, and means for moving said member to increase the distance between the abutment and the last mentioned slidable friction element.

In testimony whereof, I hereunto set my hand.

JOHN F. DORNFELD.

In the presence of—
W. H. STIEMKE,
CHAS. R. BLUMENFELD.